Dec. 14, 1971

E. BREYER

3,626,603

MEANS FOR THE CONTACT-FREE GUIDANCE AND
PROCESSING OF WEB-SHAPED ARTICLES

Filed Jan. 23, 1970

INVENTOR.
EBERHARD BREYER

BY

ATTORNEYS

INVENTOR.
EBERHARD BREYER

United States Patent Office 3,626,603
Patented Dec. 14, 1971

3,626,603
MEANS FOR THE CONTACT-FREE GUIDANCE
AND PROCESSING OF WEB-SHAPED ARTICLES
Eberhard Breyer, Herrenberg, Germany, assignor to
Schilde Aktiengesellschaft
Filed Jan. 23, 1970, Ser. No. 5,323
Claims priority, application Germany, Jan. 28, 1969,
P 19 04 101.1
Int. Cl. F26b 13/00
U.S. Cl. 34—156                                18 Claims

ABSTRACT OF THE DISCLOSURE

Convenient, accurate and high speed conditions of web material over a course of travel where it is free from contact with any solid means is made possible by an apparatus comprising an elongated stationary cylinder having aerostatic means arranged on its surface which aerostatic means provides an outward force of a processing medium such as air against a first surface of a helical wrap of web material to keep it spaced from the outer surface. With a feeding means at the forward feed end of the cylinder inclined at an angle alpha ($\alpha$) to the axis of the cylinder providing a helical constant web feed, an extracting means including a tension control means cooperates with the outward aerostatic force to keep the web in a state of equilibrium spaced from the outer surface. The aerostatic bearing means comprises an internal blower or ventilator means which forces the processing medium out under pressure through rectangularly shaped pockets axially aligned in peripherally spaced rows. The rows have suction inlets therebetween through which the processing medium returns and the pockets may or may not have suction inlets therebetween. A convective means operates on the outer surface of the web to condition it. Suitable flow control means allow easy variation of the aerostatic pressure about and along the cylinder. Housing means and further conditioning means may be provided about the cylinder. A chain feed means assures quick and simple initial placement of the web.

BACKGROUND OF THE INVENTION

(1) Field of the invention

This invention generally relates to a web material conditioning means and more particularly contemplates an apparatus for the contact-free guidance and processing of flexible continuous generally air impermeable web-shaped products while simultaneously applying any heat energy which may be required for the web processing. Heat energy may be supplied by convection and/or in the form of infrared or ultraviolet radiation.

Devices of this type are preferably employed to dry wet webs of materials such as woven fabrics, non-woven fabrics and foils or in the further processing of such webs of materials after dyeing, impregnating, lacquering or coating of one or both sides of the web for drying as well as jellifying, vulcanizing and polymerization or any other operation under the influence of heat or through converted forms of energy, whereby the stresses created in the web of material or in the coating thereof by the aforesaid processing are canceled out without the formation of creases and/or curling of the edges and without in any way touching or damaging the web of material or the coating thereof.

(2) Prior art

In the past it has been the practice to utilize means whereby the web of material being processed is conveyed vertically between air nozzles which blow upon the surface of the web of material from both sides and form the sole means for the guidance thereof in its upward rise until the web of material can be turned around by rolls without damaging the coating thereof and pass downwardly or further processing.

A disadvantage in these devices is that the web has an increased tendency to form longitudinal creases with the increased height of the processing channel as a result of the tensile stresses which increase with the height. Moreover, the generally present spatial limitation for the height of construction of these devices limits the capacities which can thereby be achieved especially if the processing times are comparatively long.

Other prior art means are set forth in German Pats. 970,045 and 1,037,427, Swiss Pat. 415,454, as well as the German printed application 1,239,988 wherein the web of material being processed is carried and guided horizontally under moderate tensile stress between a processing medium preferably employing air jets from nozzles. The drawback in these devices, however, is the lack of position-stabilizing forces on the web of material being processed which are normal to its course of path. For this reason the distance which the nozzles or nozzle boxes are spaced from the bottom and top of the web must be made comparatively large to avoid their being touched by the web as a result of flutter effects caused by vortex and/or as a result of a curling of the lateral web edges caused by the stress due to shrinking such as may be the case of webs of materials coated on one side.

In other prior art forms of web conditioning devices the web of material is slightly curved in the direction of conveyance because such a curvature of the web material towards the direction of curling of the lateral web edges precludes and suppresses curling of the edges. However, with these devices the slightly arched web of material may slope slightly toward the lateral run as a result of the smallest irregularities in the supply and distribution of the processing medium carrying the web and as a result the lack of any lateral guiding forces. With this device the length and hence capacity is limited to a small multiple of the width of the web of material if safe operation of the apparatus is to be insured. This limitation limits its efficiency and hence is a decided disadvantage.

A very extreme form of construction of web conditioning apparatus, wherein the web of material being processed is guided therethrough in a substantially closed arc about the stationary jacket of a cylinder, is disclosed in U.S. Pat. 3,279,091. Here in order to support the web of material, thin jets of the processing medium are blown from a number of slot-shaped nozzles extending the length of the cylinder jacket into the space between the bottom side of the web and the cylinder jacket, from which space a portion of the medium may escape laterally of the web material, and from which space the remaining part of the medium is sucked back through the openings made between the air jets in the cylinder jacket.

A drawback of this apparatus is the considerable reduction which the static pressure supporting the web of material undergoes as a result of the dynamic pressure of the processing medium flowing laterally away between the bottom part of the web and the cylinder jacket and toward the return openings located between the air jets in the cylinder jacket. As a result of the staggered arrangement of the return openings on the cylinder surface the total pressure distribution resulting therefrom becomes uneven under the web of material. For these reasons and because of the relatively great gap distance between the bottom of the web and the cylnder jacket only comparatively light webs of material can be guided and processed satisfactorily by this apparatus. When the apparatus is operated with a heavier web of material the system is subject to buffeting, and fluttering of the web of material is produced by the dynamic pressure of the processing medium flowing away at a correspondingly greater velocity increased still further under these circumstances on account of the uneven pressure distribution. This is a critical flow condition which was recognized and defined by Bernouilli during his life from 1700–1782. It is a further disadvantage that even with a comparatively large diameter of the cylinder the length of the web which may be processed by the apparatus is still small in comparison with the size of the apparatus, so that particularly in methods requiring long processing periods the capacity that can be achieved with the apparatus remains low.

SUMMARY OF THE INVENTION

Accordingly, it s a primary object of the invention to eliminate the above deficiencies and drawbacks and to provide an apparatus for the contact-free guidance and processing of generally an impermeable, flexible, web-shaped product by means of air, gases or vapors while simultaneously applying any heat energy which may be required for the web processing. Heat energy may be supplied through convection and/or in the form of infrared or ultraviolet radiation by means having a comparatively large capacity in comparison with the outer dimensions of the apparatus, so that even in methods requiring long processing periods high capacities can be achieved with the apparatus.

By means of my invention contact-free guidance of the web with comparatively small tensile stresses is effected without any tendency of buffeting flutter either with very light and very heavy webs of materials in similar fashion and with such precision that the possible lateral course of path remains within customary boundaries even in an apparatus having a large capacity. Further, as a result of the type of web guidance in a web coated only on one side there is no curling of the lateral edges of the web which would otherwise occur as a result of shrinkage stress.

These problems are overcome and other advantageous results are achieved according to my invention by guiding the web of material being processed in one or more helical windings about a stationary elongated cylindrically shaped member. The outer surface of the elongated cylinder member as an aerostatic bearing means over the entire area covered by the web. Advantageously the bearing means comprises supporting pockets each having flow-in throttles which are connected through distributor channels to ventilators or blowers preferably disposed within the cylinder. On both sides and/or around the supporting pockets there are outlet paths for the processing medium. Further, means are provided to bring the air, gaseous or vaporous processing medium conveyed by the ventilators or blowers for the contact-free aerostatic bearing and guidance of the web of material through said parts of the apparatus to the temperature required for the processing of the web of material. Finally, the cylinder is preferably disposed in an insulated housing, within which are provided, in suitable arrangement about or above the web of material being guided free from contact about the cylinder in the form of a helix, individually known processing means such as radiators emitting infrared and/or ultraviolet, nozzle boxes having apertured or slotted nozzles, suitable means for heating and ventilators for conveying the gaseous or vaporous processing medium through the nozzles onto the web of material.

In a further feature of the invention the apparatus is provided with a means for the tension control of the web in order to maintain optimum conditions for the aerostatic bearing and guidance of the web of material. This tension control means may be constructed in a manner known per se and placed preferably at the outlet end of the apparatus. By this means a loop of the web of material is guided downwardly between two guide rolls having a frictionless parallel-guided, preferably vertically movable counter-balanced roll mounted loosely on both sides. This latter roll may be controlled with suitable means to produce the desired tension of material whereby with a constant feed velocity of the web and in response to the variable position of the tension-control roll, which roll position is varied in accordance with a rated value corresponding to the shrinkage or expansion of the web of material obtained during the processing within the apparatus, the control of the extraction velocity for the web may be effected.

In another particularly advantageous further development of the invention particularly adapted to a horizontal arrangement of the cylinder axis of the apparatus and useful especially with a comparatively heavy web of material and large capacity of the apparatus, the variation of the gap between the bottom side of the helical contact-free web and the cylinder surface may be cancelled or adjusted by adjusting the static pressure of the processing medium produced in the supporting pockets. Thus to compensate for the weight of the web the static pressure in the area of the upward facing surface of the cylinder jacket may be varied by a corresponding amount greater than in the area of the downward pointing surface. This pressure difference may be effected in a known manner such as by varying the rotational speed of the ventilators serving said areas and, in the case of a central ventilator arrangement, by adjusting throttle or bypass means for the processing medium being guided to the respective areas of the cylinder surface.

Finally in an embodiment of the apparatus which is particularly adapted to achieve a comparatively high specific heat transfer output especially on the bottom side of the web of material being processed, the supporting springs of the preferably rectangular supporting pocket are constructed either as a slot-shaped nozzle bisecting the supporting pocket or as two-slot-shaped nozzles which cooperates with the two discharge rims of the supporting pockets. In the former embodiments the openings of the slot-shaped nozzles are preferably at the same level and in the latter embodiment having two slot-shaped nozzles the supporting pocket located therebetween is bisected by a wall extending preferably diagonally from one corner to the other.

The supporting pockets for the aerostatic bearing and guidance of the web of material being processed are inserted into the surface of the stationary cylinder so that their outermost edges lie in and form the outer surface of the cylinder. The pockets are preferably disposed in rows extending parallel to the axis of the cylinder and the rows in turn are arranged in a helical path about the cylinder in the area expected to be covered by the web of material over its course of travel about the cylinder. Allowance may be made for lateral deviations.

In devices for the processing of webs of materials having a relatively small web strength and/or in devices where webs of materials of very different widths are processed, the supporting pockets may be preferably separated from one another by outlet paths both in a peripheral direction and in the direction of the cylinder axis.

By contrast in devices used particularly for the processing of comparatively heavy webs of material the supporting pockets in each row are placed close to or contacting one another in an axial direction without outlet paths therebetween. This close spaced arrangement provides extra force to allow the rate of web delivery and/or reduction in the power consumption requirement of the ventilators in the area. Axially spaced supporting pockets with an outlet path therebetween may be provided on opposite ends of the rows of close spaced supporting pockets to accommodate any possible lateral web deviations. The axial rows of pockets may remain peripherally separated by outlet paths therebetween through which the processing medium may return to the blowers or ventilators for recirculation.

For the convenient introduction of the beginning of a web of material into the apparatus according to the invention at the start of the processing a chain mounted on gimbals and having lateral carrying and guiding rolls is helically guided to the web outlet in a preferably U-shaped guide rail from the web inlet in the no-load zone between the possible area of movement of the web, between the windings thereof about the stationary cylinder and back therefrom via driving and return chain wheels whereby a member of the chain is provided with a preferably stirrup-shaped means for attaching the pointedly cut beginning of the web of material. Known means may be used to drive the chain.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which.

DESCRIPTION OF THE PREFERRED EMBODIMENTS

Figure 1:
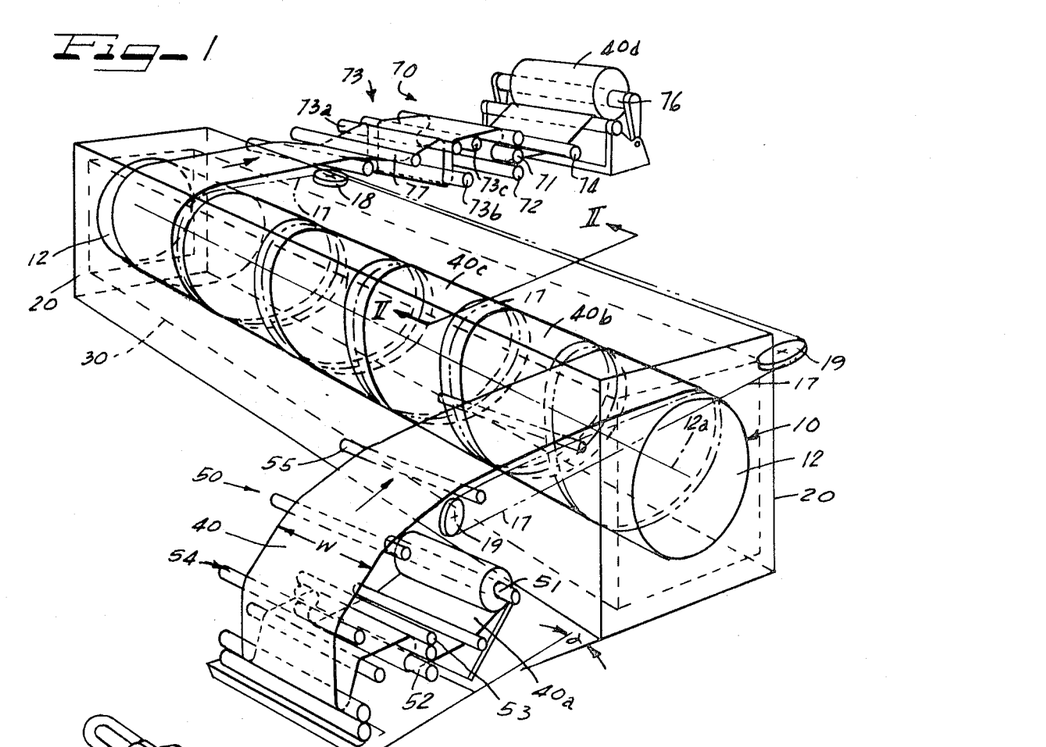
FIG. 1 is a full-view transparent illustration of an apparatus in accordance with the invention including the auxiliary means required for feeding as well as extracting the web of material.

The web conditioning apparatus according to the invention is shown in FIG. 1 to comprise a conveying means 10 which is disposed in an insulated housing 20 along with a treating means generally indicated at 30 for processing a web of material 40 by means of air, gases or vapors, while at the same time the energy required for the treating and processing means 30 is fed through convection and/or in the form of infrared or ultraviolet radiation.

In the embodiment shown in FIG. 1 a roll of untreated web material 40a is fed by a web feeding means generally indicated at 50 to the apparatus 10 from an uncoiling means 51 of the feeding means 50 over a roll frame 52 having a back pressure roller 53 through a suitable work means 54. Depending on the respective process for lacquering, impregnating, spreading or coating, the web 40 is fed further over a number of deflection or guide rollers such as indicated at 55 whereby under certain circumstances certain additional operations not described here in detail but which will be known to those skilled in the art, can be carried out on the web being processed through the latter rolls.

The conveying means 10 includes a horizontal stationary cylinder 12 and the web of material 40 is fed through the apparatus in helical windings such as shown at 40b and 40c about the cylinder 12 free from contact therewith. The web 40 passes through the processing housing 20 at a running speed corresponding to the required processing period and the capacity of the apparatus. After leaving the processing housing 20 the web enters into a web extracting means 70 and therein passes through a roll frame 71 having a back pressure roll 72 and thence over a plurality of other rolls generally indicated at 74 which serve for the suitable guidance of the web to a winding means 76 where the treated web 40d is wound up, or from where it is conducted in a direct manner, not shown, for further processing.

To maintain the conditions for the aerostatic bearing of the web of material 40 guided helically about the cylinder 12 of the apparatus, there is disposed between the finishing run of the web from the housing 20 and the roll frame 71 a means 73 for controlling the tension. This tension control means 73 may be constructed in a known manner to include a web loop guided downwardly over a first guide roll 73a around a frictionless parallel-guided preferably vertically movable counter-balance roll 73b mounted loosely on both sides and upward over a second guide roll 73c. The tension control roll 73b may be loaded with a suitable means, not shown here, but as will be understood by those skilled in the art, to produce the desired web tension against the loop of the web of material, so that, for example, with constant feeder velocity of the web through the roll frame 52 in response to the variable position of the tension-control roll 73b set at a selected rated value corresponding to the shrinkage or expansion of the web of material 40 obtained during the processing within the apparatus in accordance with the invention, the control of the extraction velocity of the web may be effected by changing the driving speed of the roll frame 71.

Viewed in the direction of travel of the web, there is disposed preferably ahead of the aforesaid tension-control device 73 a web aligner roll means 77 for the lateral control of the web of material to one edge of the web or for the central run thereof. The web aligner means 77, the use of which is particularly advantageous in devices having large capacity, automatically adjusts in a known manner the lateral course of travel of the web so that the take-up means is accurately fed.

There may further be provided means for stretching the web of material at suitable points on the inlet and/or outlet of the web outside the apparatus in accordance with the invention, insofar as it is appropriate for the treated material and/or the processing thereof.

Figure 3:
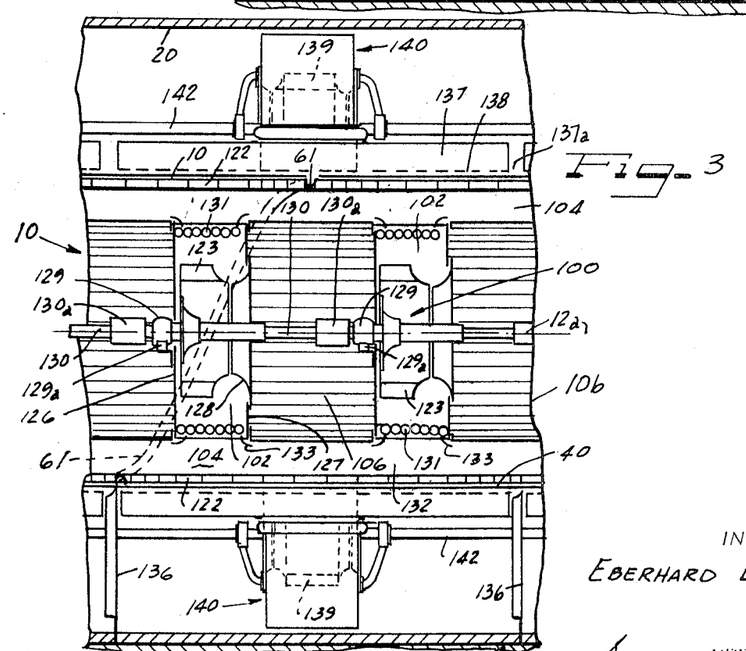
FIG. 3 is a longitudinal cross-sectional view of a portion of the apparatus shown in FIG. 2 covering the area of a half-winding of the web of material.
Figure 6:
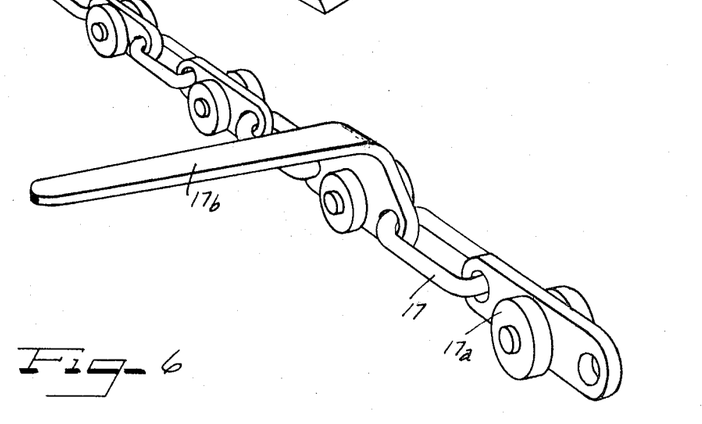
FIG. 6 is a chain mounted on gimbals having a stirrup-shaped carrier for attaching and introducing the beginning of the web of material into the apparatus in accordance with the invention at the start of the processing.

For the convenient introduction of the beginning of a web of material 40 into the housing 20 at the start of the processing, a chain 17 mounted on gimbals is helically guided to the web outlet in a preferably U-shaped guide rail such as shown at 61 in FIG. 3 from the web inlet in the no-load zone between the area of movement of the web between the windings 40b and 40c thereof about the stationary cylinder 12 and back therefrom via a suitably arranged driving wheel 18 and return wheels 19. A short portion of the chain 17 mounted on gimbals is shown in detail in FIG. 6 as having lateral carrying and guiding rolls 17a as well as a preferably stirrup-shaped means 17b for attaching the pointedly cut beginning of the web of material.

To obtain the helical slope of the web about the static cylinder 12 of the apparatus the feeding means 50 described above for feeding the web 40 as well as the extracting means 70 for removing the treated web are disposed obliquely of the lateral axis of the apparatus at an angle of inclination alpha ($\alpha$). The angle of inclination alpha, depends upon many factors such as the maximum web width, the allowance for a possible web lateral course of travel the strength of the required supporting construction for the cylinder as well as the diameter of the selected cylinder 12.

In determining the dimensions of an apparatus in accordance with the invention it is to be borne in mind that with a diameter $d$ of the cylinder 12, a web width $w$ and an effective static pressure of $\Delta p\infty$ produced underneath the web for the aerostatic bearing and guidance thereof by means of the supporting pockets, a tension force Z is generated according to the following equation:

$$Z = (0.5)(d)(b)(\Delta p\infty)(1/\cos \alpha)$$

This tension force Z, when combined with the force produced by a correspondingly selected load of the tension control roll 73b described above for tensioning the web, produces a state of equilibrium of the web.

The static pressure $\Delta p\infty$ of the processing medium to be produced underneath the web for the safe contact free guidance of the web by means of the supporting pockets may be in the range of from three to 120 times the value of the weight of the web being processed. The smaller value is preferably employed with devices for processing very heavy stable webs of materials to keep the ventilation powers used for the aerostatic bearing and guidance of the web within justifiable limits, whereas the higher values may be employed with devices wherein very light comparatively less stable webs of materials are treated. These higher values give the lighter webs an adequate dimensional stability when a greater precision is required for the web being guided due to the feed in accordance with a relatively large capacity of the respective apparatus.

In view of the above, devices which are preferably employed for the processing of the lighter webs having a comparatively small dimensional stability are generally constructed with a diameter of the static cylinder 12 which is smaller than that of devices employed for processing webs with a high stability.

Figure 2:
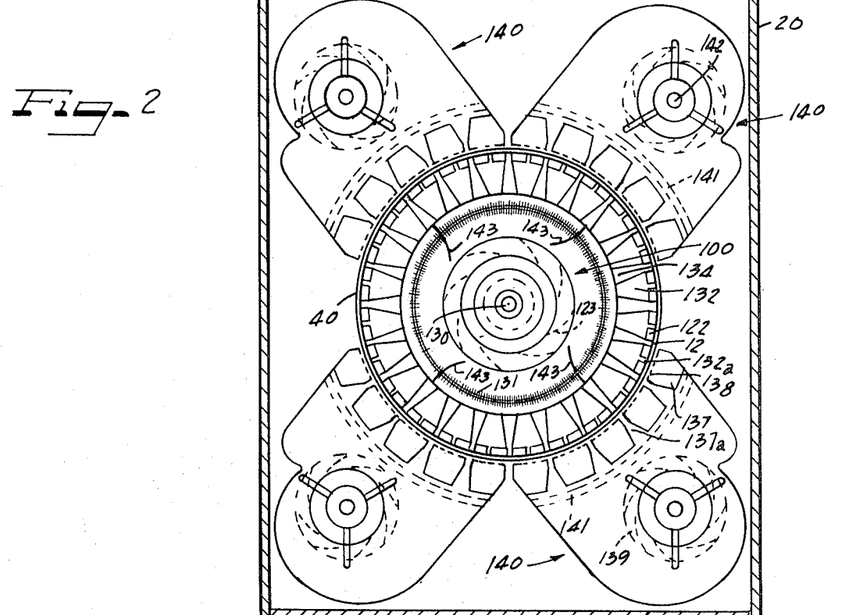
FIG. 2 is a cross-sectional end view of an apparatus of FIG. 2 taken along the line II—II showing a particular embodiment of the means for the convective processing of the surface of the web of material.

Referring to FIG. 2 there is shown a cross-sectional view of an apparatus in accordance with the invention showing a particularly advantageous embodiment employing a small diameter static cylinder 12 wherein a plurality of interior ventilator means 100 are centrally arranged in series one behind the other for the delivery of the processing medium through distributor channel means 132 and through the throttle means 132a to the surface of the static cylinder 12.

In this form of construction the interior ventilator means 100 may preferably be high power impellers having blades 123 which are strongly curved toward the rear 10b of the apparatus 10 wherein the required pressure increase of the processing medium occurs within the impeller so that the use of spiral housings for the same purpose may be dispensed with. To provide these advantageous results it is necessary, as evident in the longitudinal section of FIG. 3, to arrange each ventilator impeller 123 coaxially with a first circular wall 126 and a second circular wall 127 which will separate an area of first suction chambers 106 from an area of first and second pressure chambers 102 and 104 respectively. The second wall 127 on the suction side has a suitable inlet nozzle 128 therein for the processing medium under suction and the first wall 126 on the back side is designed with a carrier 129a for a bearing 129 of a ventilator shaft 130. To simplify the assembly, the ventilator shaft 130 may be subdivided in accordance with the distance of the ventilators and connected with a suitable coupling 130a directly beside the point of support 129.

In a particularly advantageous development of the invention, heat carrying, preferably ribbed pipes 131 are mounted about each ventilator impeller 123 between the first and second housing walls 126 and 127 in a plurality of concentric windings whereby they serve to bring the contacting processing medium delivered by the ventilators to the temperature required for the processing of the web.

At the periphery of the circular housing walls 126 and 127 of the ventilator, the processing medium distributor channels 132 are peripherally connected in side-by-side relation at the proper distance and thus extend parallel to the axis 12a of the stationary cylinder 12. A guide blade 133 may be mounted in the distributor channels on both sides of the connecting openings at the corners to reduce the deflection resistance.

The cross-section of the individual distributor channels 132 are comparatively large so that the flow speed of the processing medium therein is small in relation to the flow speed through inlet throttles in the supporting air pockets 122. Further, the distance between the ventilators in an axial direction is attuned with the remaining conditions such that the rate of delivery of the processing medium by each ventilator means 100 is not too great. If all these design considerations are observed then a corresponding even distribution of the processing medium is assured from the distributor channels through the flow-in throttles into the supporting pockets. With this even distribution the precise mounting and aerostatic guiding of the web as required for high capacity operation is readily obtained.

In the particularly advantageous further development shown in FIGS. 2 and 3, the processing medium is delivered to each winding of the web about the static cylinder 12 by two ventilator means 100 which force the medium through the distributor channels 132 and out through the supporting pockets 122. The processing medium flows away from the pocket 122 via outlet paths but is sucked back by the ventilator means 100 through interspaces 134 in the spaces between the distributor channels 132.

In FIG. 3 there is apparent, among other things, a half-winding of the U-shaped guide rail 61 having the chain 17 therein and mounted on gimbals for introducing the beginning of the web 40 into the housing 20 and helically guiding it about the stationary cylinder 12. A guide rail support means 136 is mounted at the bottom of the stationary cylinder 12 at the place where the guide rail passes the bottom side of the stationary cylinder 12 and where the cylinder is attached within the insulated housing 20 of the apparatus. These supports 136 are preferably placed obliquely to the axis 12a of the cylinder is accordance with the angle of inclination alpha (α) of the web, so that they may be constructed with a comparatively broader base without limiting the area of movement of the web.

A plurality of convective means 140 are mounted within the insulated housing 20 about the stationary cylinder 12 of the embodiment shown in FIGS. 2 and 3 for the convective processing of the surface of the web 40. Each means 140 preferably comprise a number of nozzle boxes 137 having circular or slot-shaped nozzle means 138 through which the processing medium is blown onto the surface of the web 40 by an exterior ventilator means 139. Again the processing medium may be sucked back through spaces 137a between the nozzle boxes 137. Also ribbed tubular heating bodies 141 may be provided with the aid of which the transfer of the heat required for the processing is effected from a suitable heat carrier to the processing medium.

The arrangement of a plurality of this type of convective processing means 140 may be advantageously effected in one or more rows parallel to the axis 12a of the stationary cylinder 12, so that the drive of a plurality of coaxially mounted exterior means 139 may be effected from a common shaft 142 extending therethrough.

Figure 4:
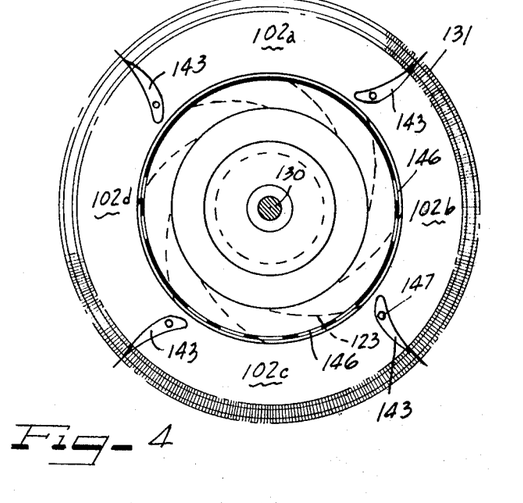
FIG. 4 is a cross-sectional view of a ventilator of the apparatus in FIG. 2 showing the area of the bypass ring for the control of the differential pressure, particularly for the surface of the cylinder directed upwardly and downwardly.
Figure 5:
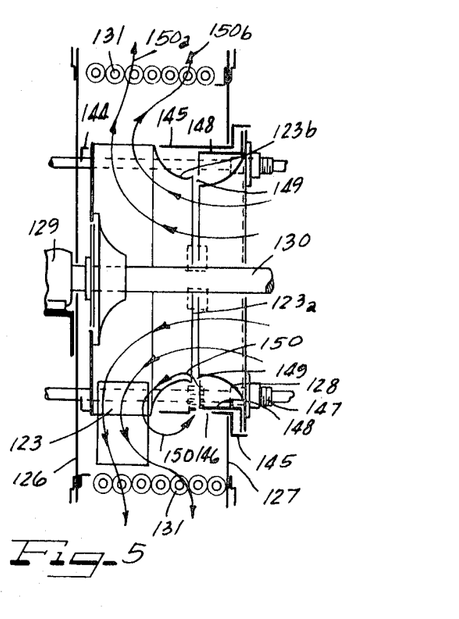
FIG. 5 is a longitudinal cross-sectional view of the ventilator shown in FIG. 4.

As shown in greater detail in FIGS. 4 and 5 the interior ventilator means 100 may each include a number of bypass openings 146 in a seal ring 145 at the suction end thereof. A control ring 148 which can be moved toward and away from the seal ring 145 by a screw means 147 allows accurate control of the bypass opening size. The control ring 148 is connected with the inlet nozzle 128 such that when the control ring 148 is in its innermost locked position the inlet nozzle 128 connected therewith extends slighly into the suction opening 123a of the interior ventilator means 100 thereby forming with a cover disk 123b of the ventilator impeller 123 an inlet gap 149 of the narrowest possible dimensions.

The cover disk 123b may expand to enlarge the gap 149. Also the inlet gap 149 may be enlarged by moving the control ring 148 with the adjusting screws 147. By increasing the cross-section of opening for the bypass openings 146 a short circuit of the processing medium may be created as indicated by the arrow 150 whereby the incoming medium flows back through the inlet gap into the suction opeining of the ventilator means 100. The second pressure chamber 102 may be divided into a number of generally separated areas 102a, 102b, 102c and 102d for example by divider blades 143 which may be advantageously mounted in a fixed pivotal manner on the screw means 147. The magnitude of the short circuit 50 in each of the areas 102a, 102b, 102c and 102d will vary in accordance with the controlled cross-section of the bypass openings 146 and depend on the number of passages 146 in the seal ring 145 in each of the areas of the diameter 102. Further, enlargement of the bypass openings 146 in the area 102a will cause the circulation of a smaller bypass volume in the delivery areas 102b and 102d while a larger bypass volume will be created in the delivery area 102c.

A different pressure output is obtained in each of the areas of the pressure chamber 102 as a result of the high-power ventilator impeller having blades which are strongly curved toward the rear, so that a correspondingly different torque element is imparted to the pressure delivering means and the desired different static pressure $\Delta p$ is generated in the respective areas.

In a preferred embodiment of the invention not shown in the drawings but which may be understood from FIGS. 4 and 5 and which particularly serves for the processing of heavy webs of materials with great stability, the diameter of the stationary cylinder is relatively large so as to achieve a great web length capacity and also so that a plurality of ventilators may be decentrally disposed within the cross-section of the cylinder to deliver the processing medium from the distributor channels through the flow-in throttles into the supporting pockets. As stated previously, a sub-division of the cross-section of the first pressure area 102 into four pressure delivery areas separated from one another is of advantage and therefore the ventilator means 100 may be disposed within the stationary cylinder in four rows of ventilation, one for each area. These rows conventiently permit a different pressure adjustment in each area by merely varying the rotational speed of the drive of each row of ventilators.

Aerostatic bearings in the simple form having supporting pockets with flow-in throttle and discharge paths are not new in the art, and the first operable bearings for machines have been built since the end of the previous century. The advantages of these bearings over other type of bearings are the nearly complete freedom from friction thereof in the area of low and intermediate sliding velocities, as well as their complete freedom from wear.

The forms employed for supporting pockets of aerostatic bearings are generally known as quadratic or rectangular types, because with certain outer dimensions for the supporting pockets under a predetermined pressure the greatest possible supporting forces can be achieved therewith. Nevertheless, types of supporting pockets with other than the above mentioned forms are also possible.

Likewise, arrangements of a plurality of supporting pockets in groups without discharge paths located therebetween are also used to achieve a correspondingly stable position of the aerostatically mounted body under slightly varying loads, whereby each supporting pocket element is likewise provided with a separate supporting spring, by which the medium employed for the bearing is delivered into the supporting pockets by a flow-in throttle.

Figure 7:
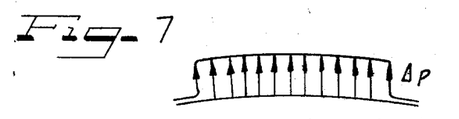
FIG. 7 illustrates schematically how the static pressure distribution in a supporting pocket below the web of material guides the web free from contact about the cylinder in the form of a helix.
Figure 8:
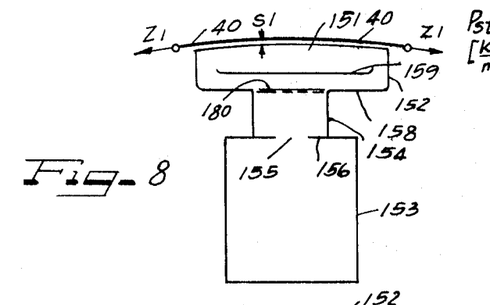
FIG. 8 is a cross-sectional elevational view of a supporting pocket means construction having a flow-in throttle and distribution channel for the processing medium.
Figure 9:
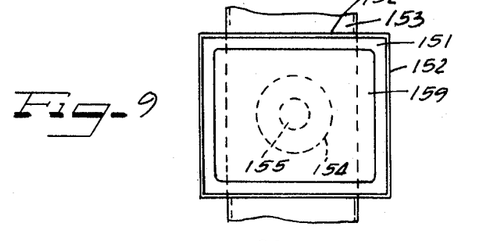
FIG. 9 is a plan view of the pocket construction of FIG. 8.

A supporting pocket which may be employed individually as well as jointly in the apparatus in accordance with the present invention is shown in FIGS. 8 and 9. In FIG. 7 there is shown the projected distribution of the static pressure $\Delta p$ of the processing medium in a supporting pocket 151 and underneath the web of material 40 wound helically about the static cylinder of the apparatus 12. In FIGS. 8 and 9 the course of pressure of $\Delta p$ within a discharge rim means 152 is constant if the supporting pocket 151 is sufficiently deep because the lateral flows in the supporting pocket are spread at comparatively low speeds whereby the dynamic pressure and the variation thereof over the dimension of the supporting pocket is negligible.

If the supporting pockets 151 are separately arranged, the attachment thereof on a distributor channel 153 to achieve a low-resistant discharge of the processing medium along the four discharge rims 152 may be slightly spaced preferably with a neck-shaped intermediate piece 154. A flow-in throttle may take the form of a bore 155 in an upper channel wall 156.

FIG. 8 shows the arched course of a segment of a web of material 40 being helically guided free from contact about the static cylinder of the apparatus in accordance with the invention. A working gap $s1$ between the web and the top of the discharge rims 152 of the supporting pocket 151 is shown symbolically with the tensile forces Z1 operating on the web. The tensile forces at this point are in a state of equilibrium with the static pressure $\Delta p\infty$ which is effective underneath the web.

In the supporting pocket 151 shown in FIGS. 8 and 9 a baffle sheet 159 is disposed above the mouth 180 of a supporting spring at a proper distance from the bottom 158 of the supporting pocket. As a result of a pressure differential $p_2$ existing between the distributor channel 153 and the supporting pocket the baffle sheet 159 deflects the high powered jet of the processing medium exiting from the flow-in throttle 155 and converts the same into a weak source flow near the rim 152. This embodiment of a supporting pocket having flow-in throttle and the required discharge paths is particularly employed in the apparatus according to the invention when webs of materials are to be processed having a small dimensional stability and wherein the direct contact of the bottom side of the web with the high powered jets of the processing medium would be a disadvantage.

Figure 10:
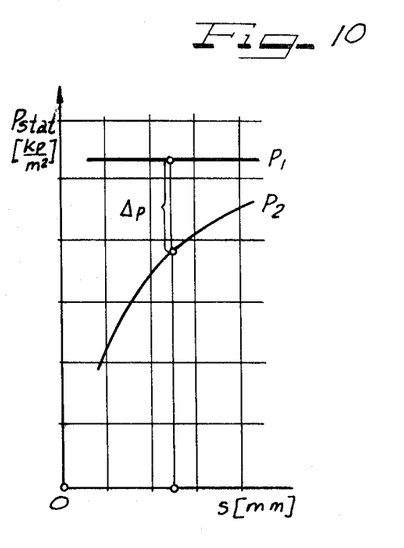
FIG. 10 is a diagram graphically illustrating the change of the pressure in response to the working width of the port in a supporting pocket when it is below the web of material.

FIG. 10 diagrammatically illustrates the behavior of the varying static pressure $\Delta p$ in effect in a supporting pocket in an aerostatic bearing of a web of material as the working gap width $s$ varies. To the extent that the variation of the working gap width $s$ is considered to to have locally effect, which fact was assumed to simplify the consumptional considerations, the total pressure $p_1$ produced by the ventilators in the region of the disturbance of the conditions as a result of changes in the working gap width $s$ in the system remains constant.

The curve $p_2$ in FIG. 10 hereby shows the computed course of the resistance of the flow-in throttle for the processing medium flowing into the supporting pocket under determined steady static conditions wherein for each working gap width $s$ the static pressure $\Delta p$ effective in the supporting pocket may be obtained from the difference $\Delta p = p_1 - p_2$.

The course of the curve giving the resistance of the flow-in throttle $p_2$ to the total pressure of the ventilator $s$ with $p_1$ being constant shows that over the plotted operating points the static pressure $(\Delta p = p_1 - p_2)$ increases materially in the supporting pocket or decreases with increasing gap $s$. This behavior of the static pressure $\Delta p$ in the supporting pocket makes it obvious that with a constant web tension Z which according to the preceding remarks is achieved through an automatic tension-control device, the distance of the web of material or the working gap $s$ is automatically adjusted in response to the static pressure $\Delta p$ in the supporting pockets, thereby achieving the stable state of equilibrium with the predetermined web tension.

Figure 11:
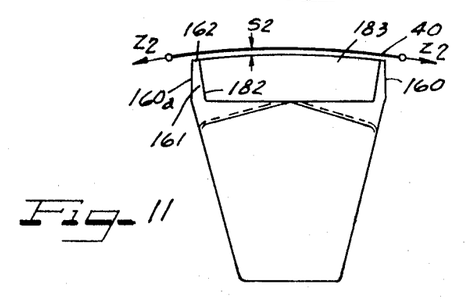
FIG. 11 is a cross-sectional side view of an embodiment of a supporting pocket according to the invention wherein the supporting springs are constructed as slot-shaped nozzles which cooperate with the two discharge rims of the supporting pocket that are aligned in a peripheral direction of the cylinder.
Figure 12:
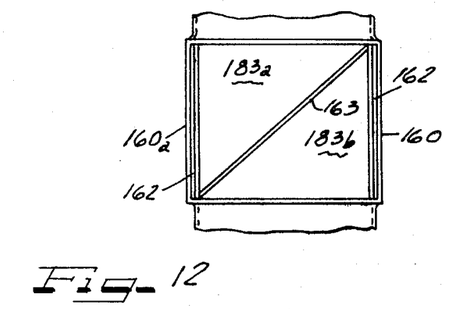
FIG. 12 is a top view of the supporting pocket shown in FIG. 11.

In FIGS. 11 and 12 there is shown another embodiment of a supporting pocket according to my invention which may be used both separately and in groups. This supporting pocket, contrary to that shown in FIGS. 8 and 9 for achieving comparatively high specific heat transfer outputs, may be provided on the bottom side of the web being processed without causing any mechanical damage to the web because the energy of the flow exiting from the flow-in throttle is distributed and dissipated to the fullest extent. In this embodiment the supporting springs 182 of flow-in throttles are combined into one unit and in each case form a thin slot-shaped nozzle 161 in combination with one of the two discharge rims 160 and 160a. The opening 162 of the nozzle is preferably flush with the discharge rims and of a narrow, elongated configuration.

Owing to the presence of two supporting springs 182 per unit, the pocket-shaped depression 183 is divided into two halves 183a and 183b preferably by a wall 163 extending diagonally from one corner to the other. As a result the discharge conditions for the processing medium are thereby balanced and control to a large extent the exact guidance of the web of material. With these characteristics the embodiment of a supporting pocket as shown in FIGS. 11 and 12 is particularly suited for processing webs of materials having small dimensional stability. During this processing the transfer of comparatively large specific heat outputs to the bottom side of the web is of advantage.

Figure 13:
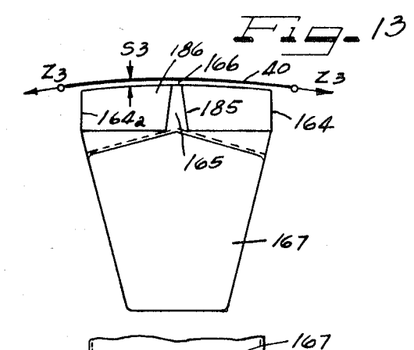
FIG. 13 is a cross-sectional side view of an embodiment of a supporting pocket of the apparatus made in accordance with the invention wherein the supporting spring bisects the supporting pocket as a slot-shaped nozzle aligned perpendicularly to the peripheral direction of the cylinder.
Figure 14:
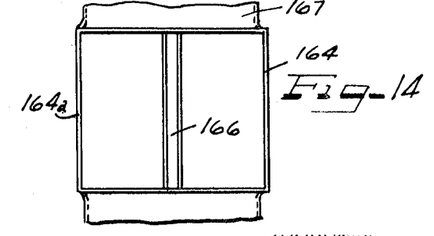
FIG. 14 is a top view of the supporting pocket shown in FIG. 13.

A further embodiment of a supporting pocket which may be employed separately as well as in groups is shown in FIGS. 13 and 14. In this supporting pocket similar to the embodiment described, the supporting spring 185 and the flow-in throttle are combined into one unit and are preferably parallel to the two discharge rims 164 and 164a which extend transverse to the direction of movement of the web. A slot-shaped nozzle 165 bisects the supporting pocket 186 and the upper edge of the opening 166 lies in the outer surface of the stationary cylinder.

For the advantageous direct assembly of the supporting pockets shown in the two last mentioned embodiments of supporting pockets with a distributor channel 167 particularly in the arrangement of individual supporting pockets with discharge paths lying therebetween, cross-sections adequate therefor are provided so that the discharge conditions for the processing medium from the supporting pockets along the length of all the discharge rims are maintained and the characteristics of the system is not disturbed.

Since with otherwise equal conditions, as described above, the cross-section of the mouth of the slot-shaped nozzle 165 is twice as large as that shown in the embodiment of FIGS. 11 and 12, the medium jet exiting from the nozzle 165 will be correspondingly higher in energy. Therefore the use of supporting pockets as shown in FIGS. 13 and 14 is of advantage when webs of materials are processed having adequately great dimensional stability or in the case of devices wherein as a result of the prevailing conditions, the cross-section of the mouth of the supporting spring of the supporting pockets is too small to result in favorable proportions for two-slot-shaped nozzles of the embodiment shown in FIGS. 11 and 12.

Figure 15:
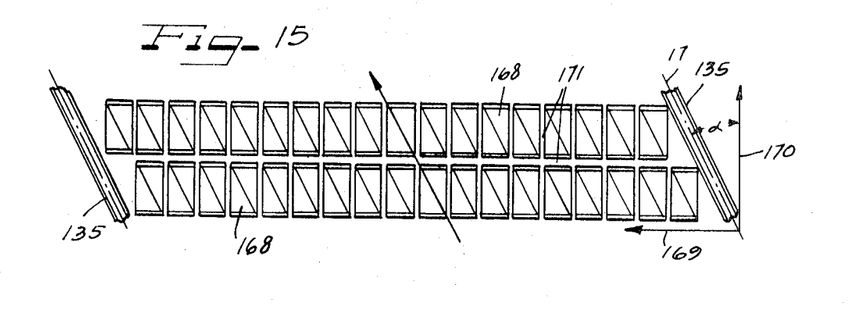
FIG. 15 is a view of two rows of supporting pockets of the apparatus in accordance with the invention, whereby the supporting pockets are polydimensionally separated from one another.

FIG. 15 shows an arrangement wherein the individual supporting pockets of the embodiment illustrated in FIGS. 11 and 12 are positioned in two rows extending parallel to the axis 12a of the stationary cylinder 12 of the invention. Between each supporting pocket 168 the discharge paths 171 are left free both in an axial direction 169 and in a peripheral direction 170. The width of each supporting pocket 168 should preferably be at least five times the value of the working gap width $s$ to assure a low-resistant discharge of the processing medium. Because of the selected ratios the working gap $s$ will probably be adjusted automatically in the apparatus with a type of web having the smallest possible weight under the proper web tension Z2.

With this arrangement according to the principles of the present invention I found that a favorable proportion for the supporting pockets 168 is a ratio of the side length of the supporting pocket extending in an axial direction 169 to the side length of the supporting pocket extending in a peripheral direction that preferably correspond to the tangent of the angle of inclination alpha ($\alpha$).

These proportions may also be applied to the separate supporting pockets 168 in FIG. 15 which are disposed in rows parallel to the axis of the stationary cylinder. Efficiency of construction and operation of the supporting pockets is achieved because of their simple orthogonal shape as well as the most uniform distribution of the heat transfer to the bottom side of the web which distribution is produced by the processing medium flowing away through the supporting springs constructed as slot-shaped nozzles as well as over the discharge rims of the supporting pockets. Efficiency of operation is also maximized because the lines, along which this heat transfer occurs intersect the web on the entire width thereof either at an angle of inclination alpha ($\alpha$) of the helically guided web or at the complement thereof ($\pi/2 - \alpha$).

Under the above conditions, when supporting pockets are employed corresponding to the form of construction shown in FIGS. 11 and 12, the diagonal separating wall 163 is placed within the supporting pockets 168 parallel to the direction of movement of the web as shown in FIG. 15 so that when these supporting pockets are at the edge of the web and only partly covered they provide full support in the covered areas.

There is further shown on both sides of the separate supporting pockets of FIG. 15 a piece of a U-shaped guide rail 135 disposed in rows and likewise helically wound about the stationary cylinder of the apparatus. These rails 135 guide the chain 17 which is mounted on gimbals and serves to introduce the beginning of a web at the start of the processing.

The supporting pocket arrangement shown in FIG. 15 is particularly suited for apparatus in accordance with the invention serving to process webs of materials having a comparatively small weight per square foot or which have a small permeability to air. Also, webs may be advantageously processed therewith having widths which vary considerably batch-wise, since the supporting action for each individual supporting pocket covered by the web is equal regardless of its position within the row, and because the smaller degree of coverage of the apparatus when used with a smaller web does not adversely affect the action of the covered supporting pockets.

Figure 16:
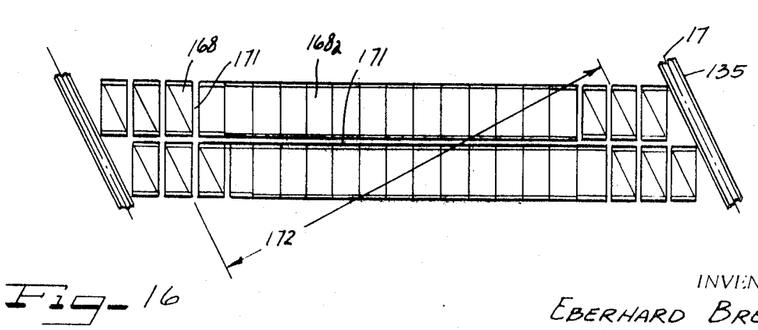
FIG. 16 is a view of two rows of supporting pockets of the apparatus in accordance with the invention, whereby in the central area of each row the supporting pockets touch one another laterally.

Another arrangement of suporting pockets is shown in FIG. 16 wherein a plurality of supporting pockets 168a are disposed in an axial direction 169 in the central area of each row located between U-shaped guide rails 135. Here the supporting pockets 168 are disposed close to each other without discharge paths lying therebetween and discharge paths 171 are left free only in an axial direction 169 in this area. Outside the area in question which cannot always be fully covered owing to a certain lateral course and/or as a result of an only slightly smaller web width a plurality of separate supporting pockets 168 are disposed on both sides thereof so that when the web runs laterally the web edges always remain supported by the processing medium under the same conditions as in the middle portion of the web.

The volume of the processing medium delivered by the ventilators through the distributor channels and through the flow-in throttles into the supporting pockets depends, among other factors, particularly on the length of the free discharge rims of each individual supporting pocket. It is therefore obvious that with conditions otherwise equal a substantially greater volume of the processing medium will be delievered per row by the juxtaposed central arrangement of the pockets 168a shown in FIG. 16 as compared with the spaced arrangement of pockets 168 illustrated in FIG. 15. For this reason the arrangement shown in FIG. 16 is particularly suited for devices for processing heavy webs of materials whereas a result of the required high static pressure $\Delta p$ in the supporting pockets, the specific volume throughput is greater than in devices for the exclusive processing of light webs. It is assumed, however, that the width of the webs will correspond substantially to the indicated width 172 so as to make maximum use of the above advantages.

Although no reference has been made to the further possible arrangement of radiator means for energy transfer by means of infrared and/or ultraviolet rays within the insulated housing 20 either alone or in combination with devices suitable for convective heat transfer and with or without additional use of ventilators for aspirating possible solvent vapors, it will be understood by those skilled in the art that these treating means may be used and positioned as required for the particular web product being processed.

The advantages which may be achieved with the apparatus according to the present invention in processing webs of materials which are generally impermeable to air are the completely stable contact-free guidance of the web under comparatively low tensile stresses Z, Z1, Z2 or Z3 free from any tendency for flutter effects or vibrations. Because of the curvature of the web there is no possibility whatever that the lateral edges of the web will curl as a result of stress due to shrinkage in webs coated on one side only. Further, as a result of the helical guidance of the web about a stationary cylinder placed within an insulated housing of the apparatus, a comparatively great web treating capactiy can be realized. This high capacity is also true when the web is heat treated because the apparatus maintains the web in the fully stable condition required for efficient and consistent heat processing.

Having thus described the many useful and novel features of a web conditioning apparatus of the present invention it will be apparent that the many disadvantages of the prior art have been clearly overcome. Although only a few specific embodiments of the invention have been illustrated and described herein, I realize that certain changes and modifications therein may well occur to those skilled in the art within the broad teachings of my invention and because it should be understood that I wish to embody within the scope of the patent warranted hereon all such modifications as reasonably and properly come within the scope of my contribution to the art.

I claim as my invention:

1. An apparatus for the contact-free aerostatic guidance of elongated web-shaped material comprising an aerostatic bearing means arranged to form a generally cylindrically-shaped surface, said aerostatic bearing means being adapted to support a helically wound elongated web of material in spaced, contact-free relation to said cylindrically-shaped surface, said web having a first side facing toward said cylindrically-shaped surface and a second side opposite to said first side, said web being adapted to be impermeable to said processing medium to the extent that said processing medium may support said web, said aerostatic means including a plurality of generally axially extending rows of pockets generally covering said cylindrically-shaped surface in the area adapted to be covered by said web, each of said pockets having in communication therewith a supply of processing medium, said processing medium adapted to be discharged through said pockets toward said web to support it, said pockets having an upstanding rim, said rim having an upper edge, said upper edge of said rim generally lying in an imaginary cylindrical outer surface, said pockets having a processing medium return path at least partially surrounding said rim, said return path extending radially into processing medium collecting means within said cylindrical member whereby high capacity, precise, contact-free guidance of the web is effected.

2. An apparatus according to claim 1 wherein said aerostatic bearing means includes a processing medium distributor means therein, said pockets having discharge openings therein, said discharge openings being connected with said distributor means via a throttle means.

3. An apparatus according to claim 1 wherein said web of material is guided helically in one or more windings about said cylindrically-shaped surface, said web being fed by a web feeding means to a first end of said cylindrically-shaped aerostatic bearing means and a web extracting means being positioned at a second end of said cylindrically-shaped aerostatic bearing means for removing said web from said means, said web extracting means including a tension control means producing a web tension so that with constant feed velocity of the web at said first end and with a shrinkage or expansion control factor predetermined, the control of the extraction velocity of the web may be automatically effected.

4. An apparatus according to claim 3 wherein said feeding means and said extracting means are disposed obliquely to the axis of the cylindrically-shaped aerostatic bearing means at the same angle of inclination.

5. An apparatus according to claim 1 wherein said apparatus further includes convective means mounted outside and spaced from said cylindrical outer surface, said covective means including a plurality of nozzle boxes having nozzle means therein whereby said processing medium may be blown into said second surface of said web.

6. An apparatus according to claim 5 wherein said cylindrically-shaped bearing means and said convective means are disposed within an insulated housing, and wherein said aerostatic bearing means and said convective means include means to bring the processing medium to a predetermined temperature required for processing of the web material.

7. An apparatus according to claim 6 wherein said apparatus further includes a web extraction meanss for removing said web from said apparatus and wherein to maintain the conditions for the aerostatic bearing and guidance of the web of material helically wound about said cylindrically-shaped surface, said apparatus includes a tension control means controlling the tension of said web whereby the extraction velocity of the web may be automatically controlled.

8. An apparatus according to claim 1 wherein said supporting pockets each have orthogonally related side walls, said side walls forming a generally closed continuous rim, at least an opposite two of said side walls forming discharge rims over which the processing medium spills into said processing medium return path.

9. An apparatus according to claim 1 wherein each of said pockets have an upstanding side wall, said side walls being generally rectangularly shaped, at least some of said pockets being divided with two supporting springs parallel to said discharge rims to form at least one elongated processing medium discharge nozzle directing a flow generally normal toward said web.

10. An apparatus according to claim 1 wherein the interior of said cylindrically shaped aerostatic bearing means includes a number of bypass openings in a seal ring at a suction end thereof, a control ring means movable to accurately control the bypass opening size.

11. An apparatus according to claim 1 wherein said interior of said cylindrically shaped aerostatic bearing means includes a pressure chamber communicating with said pockets, means axially dividing said pressure chamber into separated areas whereby the pressure of the processing medium generated in the pockets for the aerostatic bearing of the web may be varied according to whether the pocket is upwardly opening against the force of gravity on the web, is sidewardly opening, or is downwardly opening where the processing medium acts in the same direction as the force of gravity on the web.

12. An apparatus according to claim 1 wherein said pockets forming said cylindrically-shaped surface in the helically shaped area adapted to be covered by said web have means associated therewith to allow variation in the discharge of said processing medium whereby the forces acting on the web may be conveniently compensated for.

13. An apparatus according to claim 9 wherein said discharge nozzles are separated by a rectangular cup-shaped area therebetween, said cup-shaped area being divided into two halves by a wall extending diagonally thereacross.

14. An apparatus according to claim 1 wherein said aerostatic bearing means has a central axis and wherein said rows of pockets are spaced from each other to form said return path between said rows.

15. An apparatus according to claim 14 wherein each of said pockets in each row are spaced from each other to provide a further return path between said pockets whereby each of said pockets is substantially surrounded by said return path.

16. An apparatus according to claim 1 wherein said apparatus includes a processing chain mounted on gimbals, said chain having lateral carrying and guiding rows adapted to guide the forward end of the web helically about the cylindrically-shaped surface, said chain riding in a U-shaped guide rail that extends from the web entrance to the exit in a helical course about the cylindrically-shaped surface.

17. An apparatus according to claim 16 wherein a member of said chain has connected therewith a stirrup-shaped means for attaching a pointed cut forward end of the web thereto.

18. An apparatus according to claim 1 wherein said web is fed into said apparatus at an angle of inclination alpha to form said helix and wherein each said supporting pocket is of a rectangular configuration having a width and length, said width being in a ratio to said length corresponding to the value of the tangent of the angle of inclination alpha.

References Cited
UNITED STATES PATENTS

| | | | |
|---|---|---|---|
| 3,057,079 | 10/1962 | Schmidt | 34—156 |
| 3,192,647 | 7/1965 | Strube | 34—122 |
| 3,279,091 | 10/1966 | Freuler | 34—156 |
| 3,481,046 | 12/1969 | Motoharu Kuroki et al. | 34—156 X |

CARROLL B. DORITY, Jr., Primary Examiner

U.S. Cl. X.R.

226—97

UNITED STATES PATENT OFFICE
CERTIFICATE OF CORRECTION

Patent No. 3,626,603    Dated December 14, 1971

Inventor(s) Eberhard Breyer

It is certified that error appears in the above-identified patent and that said Letters Patent are hereby corrected as shown below:

Column 3, line 19, change "s" to --is--.

Column 11, line 9, after "locally" insert --limited--.

Column 13, line 33, change "delievered" to --delivered--.

Column 14, line 61 change "into" to --onto--;

line 70, change "meanss" to --means--.

Signed and sealed this 1st day of August 1972.

(SEAL)
Attest:

EDWARD M. FLETCHER, JR.
Attesting Officer

ROBERT GOTTSCHALK
Commissioner of Patents